United States Patent
Kwon et al.

(10) Patent No.: US 9,695,305 B2
(45) Date of Patent: Jul. 4, 2017

(54) POLYOLEFIN-NATURAL FIBER COMPOSITE COMPOSITION FOR EXTRUSION MOLDING

(71) Applicants: HYUNDAI MOTOR COMPANY, Seoul (KR); LOTTE CHEMICAL CORPORATION, Seoul (KR)

(72) Inventors: Oh Deok Kwon, Suwon-si (KR); Dae Sik Kim, Yongin-si (KR); Ho Geun Jung, Daejeon (KR); Byung Kook Nam, Daejeon (KR); Sung Min Cho, Daejeon (KR); Hyung Sin Lee, Daejeon (KR); Joon Hee Ko, Daejeon (KR)

(73) Assignees: Hyundai Motor Company, Seoul (KR); Lotte Chemical Corporation, Seoul (KR)

( * ) Notice: Subject to any disclaimer, the term of this patent is extended or adjusted under 35 U.S.C. 154(b) by 16 days.

(21) Appl. No.: 14/569,296

(22) Filed: Dec. 12, 2014

(65) Prior Publication Data

US 2015/0252179 A1 Sep. 10, 2015

(30) Foreign Application Priority Data

Mar. 7, 2014 (KR) .................. 10-2014-0027311

(51) Int. Cl.
| | |
|---|---|
| *C08L 23/12* | (2006.01) |
| *C08L 97/02* | (2006.01) |
| *B29C 47/92* | (2006.01) |
| *B29C 47/00* | (2006.01) |
| *B29K 9/00* | (2006.01) |
| *B29K 23/00* | (2006.01) |

(52) U.S. Cl.
CPC .......... *C08L 23/12* (2013.01); *B29C 47/0014* (2013.01); *B29C 47/92* (2013.01); *C08L 97/02* (2013.01); *B29C 47/0004* (2013.01); *B29C 2947/9259* (2013.01); *B29C 2947/92866* (2013.01); *B29K 2009/00* (2013.01); *B29K 2023/14* (2013.01); *C08L 2205/025* (2013.01); *C08L 2205/03* (2013.01); *C08L 2205/08* (2013.01)

(58) Field of Classification Search
CPC ........ C08L 23/12; C08L 2205/08; C08K 7/02
See application file for complete search history.

(56) References Cited

U.S. PATENT DOCUMENTS

2006/0084764 A1* 4/2006 Hanna .................. C08F 255/02
525/242
2014/0291894 A1* 10/2014 Kannengiesser ........ C08J 5/045
264/328.17

FOREIGN PATENT DOCUMENTS

| EP | 1805238 A1 | 7/2007 |
|---|---|---|
| KR | 10-2008-0029543 A | 4/2008 |
| KR | 10-2009-0109025 A | 10/2009 |
| KR | 10-2009-0120985 A | 11/2009 |
| KR | 10-2009-0120989 A | 11/2009 |
| KR | 10-2011-0017780 A | 2/2011 |
| KR | 10-2011-0048377 A | 5/2011 |
| KR | 10-2011-0058124 A | 6/2011 |
| KR | 10-2012-0051489 A | 5/2012 |
| KR | 10-2013-0070429 A | 6/2013 |
| KR | 10-2013-0103154 A | 9/2013 |
| WO | 2009-139508 A1 | 11/2009 |

* cited by examiner

*Primary Examiner* — Wenwen Cai
(74) *Attorney, Agent, or Firm* — McDermott Will & Emery LLP

(57) ABSTRACT

The present disclosure relates to a polyolefin-natural fiber composite composition for extrusion molding, and more particularly to a polyolefin-natural fiber composite composition, which comprises polyolefin resin, natural fiber, thermoplastic elastic rubber and an anhydrous maleic acid-grafted polypropylene-based compatibilizer, and is useful as a material for an extrusion molded article by obtaining an effect of improving dimensional stability, mechanical properties and surface quality through adjusting three-dimensional structure and particle size of the polypropylene-based compatibilizer and binding rate of the maleic acid.

5 Claims, 2 Drawing Sheets

[Example 1]

[Comparative Example 1]

POLYOLEFIN-NATURAL FIBER COMPOSITE COMPOSITION FOR EXTRUSION MOLDING

CROSS-REFERENCE TO RELATED APPLICATION

This application claims under 35 U.S.C. §119(a) the benefit of Korean Patent Application No. 1 0-201 4-002731 1 filed on Mar. 7, 2014, the entire contents of which are hereby incorporated by reference herein.

BACKGROUND (a) Technical Field

The present disclosure relates to a polyolefin-natural fiber composite composition for extrusion molding, and more particularly to a polyolefin-natural fiber composite composition, which comprises polyolefin resin, natural fiber, thermoplastic elastic rubber and an anhydrous maleic acid-grafted polypropylene-based compatibilizer, and is useful as a material for an extrusion molded article by obtaining an effect of improving dimensional stability, mechanical properties and surface quality through adjusting three-dimensional structure and particle size of the polypropylene-based compatibilizer and binding rate of the maleic acid.

(b) Background Art

In general, in order to manufacture a synthetic resin sheet or a composite sheet used as an interior/exterior material of vehicles, melamine resin, polypropylene resin, polyvinyl chloride resin, acryl resin, phenol resin and the like are used. However, the interior/exterior materials manufactured by using these synthetic resins cause atopy, asthma and the like, and it is very hard to be after-treated because it is difficult to be recycled after use as well as causing severe environmental problems by causing endocrine disrupting chemicals, odor and the like. Accordingly, development of environmental-friendly materials, which can replace the existing synthetic resin materials or composite materials, is needed.

In Korean Patent Laid-Open Publication Nos. 2008-29543, 2009-120989, 2012-51489 and 2013-70429, in order to increase interfacial adhesive strength of polypropylene resin and natural fibers such as bamboo, kenaf, yam, ramie and the like, and between the polypropylene resin and the natural fiber, resin compositions further comprising an anhydrous maleic acid-grafted polypropylene-based compatibilizer are disclosed. The resin compositions disclosed in the prior arts have defects that productivity is decreased during extrusion molding, and physical properties of the extrusion molded article are not uniform by using the natural fiber.

Further, Korean Patent Laid-Open Publication No. 2009-109025 discloses a method for extrusion molding by adding natural fiber after it is surface-modified by an electron beam when manufacturing a resin composition comprising polypropylene resin and the natural fiber. The method has defects in that the processing cost is increased, productivity is reduced, and it is difficult to homogeneously irradiate an electron beam to the natural fiber by adding the electron beam treating process for surface-modification of the natural fiber.

The above information disclosed in this Background section is only for enhancement of the understanding of the background of the disclosure and therefore it may contain information that does not form the prior art that is already known in this country to a person of ordinary skill in the art.

SUMMARY OF THE DISCLOSURE

The present disclosure describes an effort to solve the above-described problems associated with prior art.

The present disclosure provides a polyolefin-natural fiber composite composition, which has improved interfacial adhesive strength and is suitable for use as interior and exterior materials of vehicles, and has excellent environment-friendly features as well as excellent dimensional stability, mechanical properties and surface quality.

Further, the present disclosure provides a method for melt-extrusion molding using the polyolefin-natural fiber composite composition.

Further, the present disclosure provides a molded article manufactured by melt-extrusion molding the polyolefin-natural fiber composite composition.

In one aspect, the present disclosure provides a polyolefin-natural fiber composite composition comprising: polyolefin resin in 20 to 95 wt %; natural fiber in 3 to 40 wt %; thermoplastic elastic rubber in 1 to 30 wt %; and a polypropylene-based compatibilizer, whose main chain is atactic polypropylene and whose diameter is 0.5 to 200 μm, and which is grafted with anhydrous maleic acid of 2 to 10 wt %, in 1 to 10 wt %.

In a preferred embodiment, the polyolefin resin may be at least one selected from the group consisting of: a homopolymer, e.g., one selected from the group consisting of homo-polyethylene and homo-polypropylene; a random copolymer, e.g., one copolymerized from a comonomer selected from the group consisting of ethylene, propylene, butylene, octane and a $C_4$ to $C_{10}$ olefin-based monomer; and a block copolymer wherein ethylene-propylene rubber is blended with the homopolymer referenced herein.

In another preferred embodiment, the natural fiber may be at least one selected from the group consisting of kenaf, flax, hemp, jute, abaca, bamboo, coir, pineapple, ramie, sisal and henequen.

In still another preferred embodiment, the thermoplastic elastic rubber may be a copolymer copolymerized from ethylene and an a-olefin having a carbon number of 3 to 10 or styrene-butadiene rubber (SBR).

In yet another preferred embodiment, the thermoplastic elastic rubber may be at least one selected from the group consisting of ethylene-propylene rubber (EPR), ethylene-propylene-diene rubber (EPDM), ethylene-butene rubber (EBR) ethylene-octene rubber (EOR) and styrene-butadiene rubber (SBR).

In still yet another preferred embodiment, the main chain of the anhydrous maleic acid-grafted polypropylene-based compatibilizer may be atactic polypropylene, the diameter thereof is 0.5 to 200 μm, and the anhydrous maleic acid of 2 to 10 wt % is combined thereto.

In a further preferred embodiment, the polyolefin-natural fiber composite composition may further comprise at least one general additive selected from an antioxidant, a UV stabilizer, a flame retardant, a coloring agent, a plasticizer, a thermal stabilizer, a slip agent and an antistatic agent.

In another aspect, the present disclosure provides a method for extrusion molding comprising a process of melt-extrusion molding the polyolefin-natural fiber composite composition at the condition of screw rotation speed of 200 to 1,000 rpm and retention time of 10 to 60 sec.

In still another aspect, the present disclosure provides a molded article manufactured by melt-extrusion molding the polyolefin-natural fiber composite composition at the condition of screw rotation speed of 200 to 1,000 rpm and retention time of 10 to 60 sec.

Other aspects and preferred embodiments of the disclosure are discussed infra.

The above and other features of the disclosure are discussed infra.

BRIEF DESCRIPTION OF THE DRAWINGS

The above and other features of the present disclosure will now be described in detail with reference to certain exemplary embodiments thereof illustrated by the accompanying drawings which are given hereinbelow by way of illustration only, and thus are not limitative of the present disclosure, and wherein.

Figure 1:
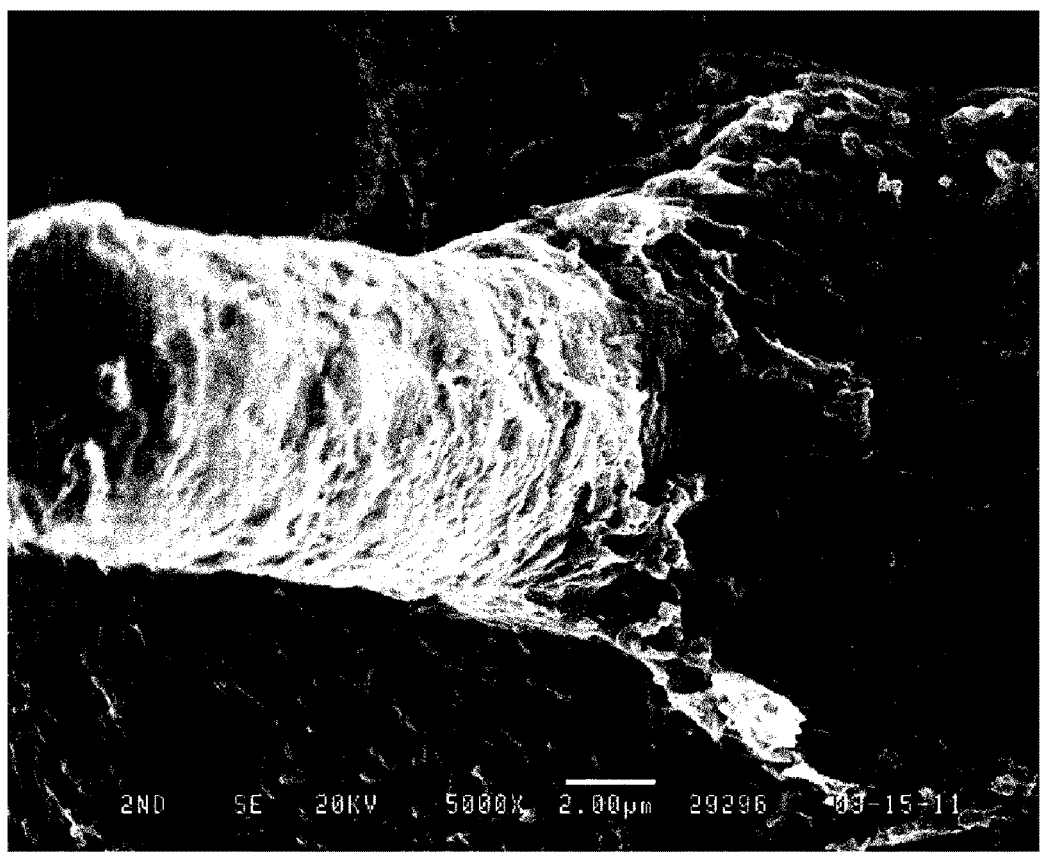
FIG. 1 is an electron microscopic picture of a composite manufactured in Example 1.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter reference will now be made in detail to various embodiments of the present disclosure, examples of which are illustrated in the accompanying drawings and described below. While the disclosure will be described in conjunction with exemplary embodiments, it will be understood that the present description is not intended to limit the disclosure to those exemplary embodiments. On the contrary, the disclosure is intended to cover not only the exemplary embodiments, but also various alternatives, modifications, equivalents and other embodiments, which may be included within the spirit and scope of the disclosure as defined by the appended claims.

The present disclosure relates to a polyolefin-natural fiber composite composition comprising a) a polyolefin resin, b) a natural fiber, c) a thermoplastic elastic rubber and d) an anhydrous maleic acid-grafted polypropylene-based compatibilizer. Namely, the present disclosure relates to a composite composition, which further comprises c) a thermoplastic elastic rubber in 1 to 30 wt % and d) a polypropylene-based compatibilizer, which is grafted with an anhydrous maleic acid of 2 to 10 wt %, in 1 to 10 wt % in addition to a composite made from a) a polyolefin resin in 20 to 95 wt % and b) a natural fiber in 3 to 40 wt %.

Each component of the polyolefin-natural fiber composite composition according to the present disclosure will be described below in more detail.

a) Polyolefin Resin

In constituting the composite composition of the present disclosure, the polyolefin resin comprised as a base resin may be at least one selected from the group consisting of: a homopolymer selected from the group consisting of homo-polyethylene and homo-polypropylene; a random copolymer copolymerized from a comonomer selected from the group consisting of ethylene, propylene, butylene and octene; a block copolymer wherein ethylene-propylene rubber is blended with the homopolymer; and a high melt strength polypropylene (high melt strength PP; HMS PP) with polypropylene branches. Preferably, the polyolefin resin may be homo-polypropylene, or a random copolymer copolymerized from propylene monomers and ethylene of 12 mol % or less or $C_4$ to $C_{10}$ olefin-based monomers, and at this time, there is an advantage of excellent stiffness and impact resistance. More preferably, the polyolefin resin may be a copolymer of propylene monomers 88 to 99 mol % and ethylene monomers 1 to 12 mol %, and at this time, there is an effect of improving scratch resistance due to low surface hardness deterioration. Further, as the polyolefin resin, polyolefin resin having melt index of 8 to 150 g/10 min (230° C., 2.16 Kgf) may be used. If the melt index of the polyolefin resin is less than 8 g/10 min (230° C., 2.16 Kgf), molding processability may be deteriorate, and if it is over 150 g/10 min (230° C., 2.16 Kgf), there may be a problem of deterioration of impact strength.

The polyolefin resin may be contained in the composite composition of the present disclosure in an amount of 20 to 95 wt %, preferably 50 to 90 wt %. If the polyolefin resin content is less than 20 wt %, there may be a defect of deterioration of stiffness and moldability, and if it is over 95 wt %, there may be a problem of deterioration of low temperature impact property.

b) Natural Fiber

In constituting the composite composition of the present disclosure, the natural fiber may be at least one selected from the group consisting of kenaf, flax, hemp, jute, abaca, bamboo, coir, pineapple, ramie, sisal and henequen.

The natural fiber may be contained in the composite composition of the present disclosure in an amount of 3 to 40 wt %, preferably 3 to 20 wt %. If the natural fiber content is less than 3 wt %, it may cause undesirable results in terms of the properties of the composite, and if it is over 40 wt %, the excess amount may reduce economic feasibility.

c) Thermoplastic Elastic Rubber

In constituting the composite composition of the present disclosure, the constitution of the thermoplastic elastic rubber is not limited, but preferably, a copolymer rubber of ethylene and α-olefin having the carbon number of 3 to 10 or styrene-butadiene rubber (SBR) may be used. At this time, the constitution of the α-olefin is not limited, but for example, it may be propylene, butene, pentene, hexene, heptene, octene and the like. The thermoplastic elastic rubber may be preferably at least one selected from the group consisting of ethylene-propylene rubber (EPR), ethylene-propylene-diene rubber (EPDM), ethylene-butene rubber (EBR), ethylene-octene rubber (EOR) and styrene-butadiene rubber (SBR). The ethylene-octene rubber (EOR) among the thermoplastic elastic rubbers may be preferably selected because an effect of improving impact strength by the octene having long side chains is the most preferable, and the relatively deteriorated stiffness may be reduced to the maximum. Further, it is preferred to use the ethylene-butene rubber (EBR) among the thermoplastic elastic rubbers, and particularly, the ethylene-butene rubber (EBR), which has the butene comonomer content of 50 mol % or more, the melt index of 0.5 to 150 g/10 min (190° C., 2.6 kg·f) and the density of 0.868 to 0.885 g/cc, may be preferably selected in terms of improving low temperature impact.

The thermoplastic elastic rubber may be contained in the composite composition of the present disclosure in an amount of 1 to 30 wt %, preferably 1 to 20 wt %. If the thermoplastic elastic rubber content is less than 1 wt %, there may be a defect of deterioration of impact strength, and if it is over 30 wt %, there may be a problem of deterioration of moldability and stiffness.

d) Polypropylene-based Compatibilizer

In constituting the composite composition of the present disclosure, as the compatibilizer, anhydrous maleic acid-grafted polypropylene-based compatibilizer may be used.

The compatibilizer is used for increasing the compatibility between the polyolefin resin and the natural fiber, and it may be at least one modified polypropylene resin comprising a reactive group, which can react with the natural fiber, for example, carboxyl group, hydroxyl group and the like, at the main chain or at the end of the polyolefin. The polypropylene-based compatibilizer may be modified polypropylene resin, in which a reactive group selected from maleic acid, anhydrous maleic acid, carboxylic acid, hydroxyl group and the like of 2 to 10 wt %, preferably 3 to 5 wt % is grafted to the polypropylene resin.

In general, a vinyl-based polymer has a structure formed from a double bond, and it may have several different forms of three-dimensional structure around the double bond. Polypropylene is a representative stereoregular polymer, and it may have atactic structure in which there is no regularity on arrangement of substituents ($CH_3$), isotactic structure in which substituents are linked in one direction, and syndiotactic structure in which substituents are combined vertically with a certain regularity. Physical properties such as polymer strength may vary depending on three-dimensional structure of the polymer, and the structure may have many influences on determining crystallinity and compatibility. This is to determine whether how many molecules can be located in a narrow space during a three-dimensional stacking process, and the denser the structure is, the higher crystallinity the polymer has, but there is a defect of low compatibility. In the three-dimensional structure of the polypropylene, the crystallinity may increase in the order of atactic<syndiotactic<isotactic. Most polypropylene, which are currently on the market for a compatibilizer, are materials having isotactic polypropylene (iPP) structure as a main chain, and they are excellent on stiffness due to their high crystallinity, but have a defect of low compatibility with the natural fiber.

Further, particle diameter of the polypropylene-based compatibilizer acts as an important fact on interfacial adhesive strength between the polypropylene resin and the natural fiber, and dispersion efficiency. Accordingly, it is preferred that the diameter of the compatibilizer may be adjusted to 0.5 to 200 μm, preferably 1 to 100 μm. If the particle diameter of the polypropylene-based compatibilizer is too small, as less than 0.5 μm, productivity may be deteriorated, and if the diameter is over 200 μm, the interfacial adhesive strength between the polypropylene resin and the natural fiber and the dispersion efficiency may be significantly reduced.

According to the prior arts, a pellet-type polypropylene-based compatibilizer whose anhydrous maleic acid content is low was used to increase the compatibility between the polyolefin resin and the natural fiber, but there was a defect that the dimensional stability was insufficient and there were wide variations in physical properties because this type polypropylene-based compatibilizer has low interfacial adhesive strength. On the contrary, in the present disclosure, a polypropylene-based compatibilizer, whose main chain is atactic polypropylene (aPP), and whose anhydrous maleic acid binding rate is as high as 2 to 10 wt %, and whose particle size is small as 0.5 to 200 μm, can be used. The compatibilizer of the present disclosure has better adhesiveness to the natural fiber and smaller diameter than the existing compatibilizer, thereby it can rapidly penetrate into the natural fiber and improve the interfacial adhesive strength. Accordingly, it is characterized by improving the dimensional stability, the mechanical properties and the surface quality.

The compatibilizer may be contained in the composite composition of the present disclosure in an amount of 1 to 10 wt %, preferably 2 to 7 wt %. If the compatibilizer content is less than 1 wt %, there may be a limit to improve the mechanical properties, the dimensional stability and the surface quality due to deterioration of the interfacial adhesive strength between the polypropylene resin and the natural fiber, and the dispersion efficiency, and if it is over 10 wt %, there may be a problem in that impact strength of the polypropylene/natural fiber composite is reduced.

Further, in constituting the composite composition of the present disclosure, together with the polyolefin resin, the natural fiber, the thermoplastic elastic rubber and the polypropylene-based compatibilizer, at least one additive commonly used such as an antioxidant, a UV stabilizer, a flame retardant, a coloring agent, a plasticizer, a thermal stabilizer, a slip agent and the like, may be further added. The amount of the additives may be adjusted to the optimal range within each range known to be available for manufacturing a composite composition, in consideration of the entire amount of production, manufacturing processes and the like. The additives may be further added in the step of mixing the polyolefin resin, the natural fiber, the thermoplastic elastic rubber and the polypropylene-based compatibilizer, and it may be also added in the separate added after mixing in a separate additional step.

On the other hand, the present disclosure is characterized in a method of manufacturing a polyolefin-natural fiber composite by melt-extruding the composition described above using an extrusion machine having at least two axes.

Namely, the polyolefin-natural fiber composite is manufactured through an extruding process after mixing the polyolefin resin, the natural fiber, the thermoplastic elastic rubber and the polypropylene-based compatibilizer.

In the present disclosure, the melt-extrusion may be conducted at the condition of screw rotation speed of 200 to 1,000 rpm and retention time of 5 to 90 sec. Preferably, it may be conducted at the condition of screw rotation speed of 300 to 800 rpm and retention time of 10 to 60 sec. At this time, in order to effectively induce shear flow and elongational flow, which are required for dispersing the natural fiber in the extrusion machine, the screw rotation speed may be 200 rpm or faster, preferably, and in terms of preventing degradation of the polyolefin resin and the polypropylene-based compatibilizer and damage of the natural fiber, the screw rotation speed may be 1,000 rpm or slower preferably. Further, for enough mixing of the polyolefin resin, the natural fiber, the thermoplastic elastic rubber and the polypropylene-based compatibilizer, the retention time in the extrusion machine should be 10 sec or longer, and for preventing degradation and improving productivity, the retention time should be 60 sec or shorter.

The polyolefin-natural fiber composite manufactured by the above method may have flexural modulus of 10,000 $kg/cm^2$ or more according to ASTM standard test method D790, preferably 13,000 to 38,000 $kg/cm^2$, tensile strength of 100 $kg/cm^2$ or more according to ASTM standard test method D638, preferably 150 to 450 $kg/cm^2$, IZOD impact strength of 3 kg·cm or more according to ASTM standard test method D256, preferably 4 to 60 kg·cm, and heat deflection temperature of 80° C. or higher according to ASTM standard test method D648, preferably 110 to 160° C.

On the other hand, the present disclosure is characterized in a molded article, which is manufactured by melt-extrusion molding of the composition described above. The molded article manufactured in this manner is useful as interior and exterior materials of vehicles.

In the present disclosure, matters other than the above-mentioned contents are not particularly limited because they can be added or omitted according to circumstances.

In addition, "include" or "comprise" means to include any components (or ingredients) without particular limitation unless there is particular mention about them in this description, and it cannot be interpreted as meaning to exclude addition of other components (or ingredients).

Hereinafter, the present disclosure as mentioned above will be described in detail about the polyolefin-natural fiber composite composition, the method for manufacturing the composite and the molded article manufacture therefrom with reference to the following examples. However, the followings are only for the understanding of the present disclosure and the scope of the present disclosure is not limited or by them, and it is obvious to a person skilled in the related art that the embodiments can be variously modified in the scope of the present disclosure.

EXAMPLES

The following examples illustrate the disclosure and are not intended to limit the same.

Example 1

A polypropylene-based compatibilizer, whose main chain is atactic polypropylene and diameter is 100 μm, and to which anhydrous maleic acid of 4 wt % is grafted, was added to a mixture of polypropylene resin, kenaf as natural fiber and ethylene-butene rubber (EBR) as thermoplastic elastic rubber, and then mixed. A polypropylene-natural fiber composite was manufactured using a twin screw extruding machine (screw diameter: 30 mm, L/D 40) at the extrusion condition of extrusion temperature of 160 to 200° C. and screw rotation speed of 400 rpm, and then a sample was molded using an injection molding machine.

Example 2

The procedure of Example 1 was repeated except for changing the mixing ratio of the polypropylene resin, the natural fiber, the thermoplastic elastic rubber and the polypropylene-based compatibilizer to mold a sample.

Example 3

The procedure of Example 1 was repeated except for using the polypropylene resin, the natural fiber and SBR as the thermoplastic elastic rubber to mold a sample.

Comparative Example 1

The procedure of Example 1 was repeated except for not using the polypropylene-based compatibilizer to mold a sample.

Comparative Example 2

A polypropylene-based compatibilizer, whose main chain is atactic polypropylene and diameter is 3 mm, and to which anhydrous maleic acid of 4 wt % is grafted, was added to a mixture of polypropylene resin, kenaf as natural fiber and polyurethane rubber as thermoplastic elastic rubber, and then mixed. And the procedure of Example 1 was repeated to mold a sample.

Comparative Example 3

The procedure of Example 1 was repeated except for using a polypropylene-based compatibilizer, whose main chain is isotactic polypropylene and diameter is 100 μm, and to which anhydrous maleic acid of 4 wt % is grafted, as a polypropylene-based compatibilizer to mold a sample.

Comparative Example 4

The procedure of Example 1 was repeated except for not using the thermoplastic elastic rubber.

Physical properties of the samples manufactured according to Examples 1 to 3 and Comparative Examples 1 to 4 were measured according to the following methods, and the results were listed in the following Table 1.

Method for Measuring Physical Properties

1) Tensile strength (breakdown): measured according to ASTM standard test method D638.
2) Flexural modulus: measured according to ASTM standard test method D790.
3) IZOD impact strength: measured according to ASTM standard test method D256 at 23° C.
4) Heat deflection temperature: measured according to ASTM standard test method D648.
5) Contraction ratio: measured according to HPC method.

TABLE 1

| | | | Examples | | | Comparative Example | | | |
|---|---|---|---|---|---|---|---|---|---|
| Classification | | | 1 | 2 | 3 | 1 | 2 | 3 | 4 |
| Composition (wt%) | Polypropylene | | 75 | 70 | 75 | 80 | 75 | 75 | 85 |
| | Natural Fiber | | 10 | 10 | 10 | 10 | 10 | 10 | 10 |
| | Thermoplastic Elastic Rubber | EBR | 10 | 15 | — | 10 | — | 10 | — |
| | | SBR | — | — | 10 | — | — | — | — |
| | | Polyurethane | — | — | — | — | 10 | — | — |
| | Compatibilizer* | (1) | 5 | 5 | 5 | — | — | — | 5 |
| | | (2) | — | — | — | — | 5 | — | — |
| | | (3) | — | — | — | — | — | 5 | — |
| Physical Property | Tensile Strength (Kg/cm$^2$) | | 180 | 150 | 185 | 120 | 130 | 175 | 185 |
| | Flexural Modulus (Kg/cm$^2$) | | 15,000 | 13,300 | 14,700 | 10,600 | 11,100 | 15,500 | 16,500 |
| | IZOD Impact Strength (kg · cm) | | 43 | 49 | 42 | 27 | 33 | 8 | 3 |

TABLE 1-continued

|  | Examples | | | Comparative Example | | | |
|---|---|---|---|---|---|---|---|
| Classification | 1 | 2 | 3 | 1 | 2 | 3 | 4 |
| Heat Deflection Temperature (° C.) | 125 | 113 | 123 | 105 | 107 | 123 | 127 |
| Contraction Ratio | 0.54 | 0.48 | 0.55 | 0.89 | 0.82 | 0.75 | 1.02 |

*compatibilizer
(1) Polypropylene-based compatibilizer whose main chain is atactic polypropylene and diameter is 100 μm, and to which anhydrous maleic acid 4 wt % is grafted.
(2) Polypropylene-based compatibilizer whose main chain is atactic polypropylene and diameter is 3 mm, and to which anhydrous maleic acid 4 wt % is grafted.
(3) Polypropylene-based compatibilizer whose main chain is isotactic polypropylene and diameter is 100 μm, and to which anhydrous maleic acid 4 wt % is grafted.

According to Table 1, it can be found that the major properties such as tensile strength, flexural modulus, impact strength, heat deflection temperature and contraction ratio of the samples of Examples 1 to 3 were improved, compared with the samples of Comparative Examples 1 to 4

On the contrary, the sample of Comparative Example 1, which does not contain the polypropylene-based compatibilizer, has low interfacial adhesive strength between the polyolefin resin and the natural fiber and the dispersion efficiency is low. Accordingly, it can be found that the tensile strength, the flexural modulus, the impact strength, the heat deflection temperature, the contraction ratio and the like of the sample of Comparative Example 1 was outstandingly decreased, compared with Examples 1 to 3.

The sample of Comparative Example 2, which contains the polypropylene-based compatibilizer having relatively large particle diameter, is difficult to penetrate into the natural fiber. Accordingly, it can be found that the tensile strength, the flexural modulus, the impact strength, the heat deflection temperature, the contraction ratio and the like of the sample of Comparative Example 2 was slightly decreased when compared to Examples 1 to 3.

It can be found that the flexural modulus of the sample of Comparative Example 3, which contains the polypropylene-based compatibilizer whose main chain is isotactic polypropylene (iPP) structure, was excellent due to high crystallinity of the compatibilizer, but its impact strength was low.

It can be found that the impact strength of the sample of Comparative Example 4, which does not contain the thermoplastic elastic rubber, was significantly decreased.

Figure 2:
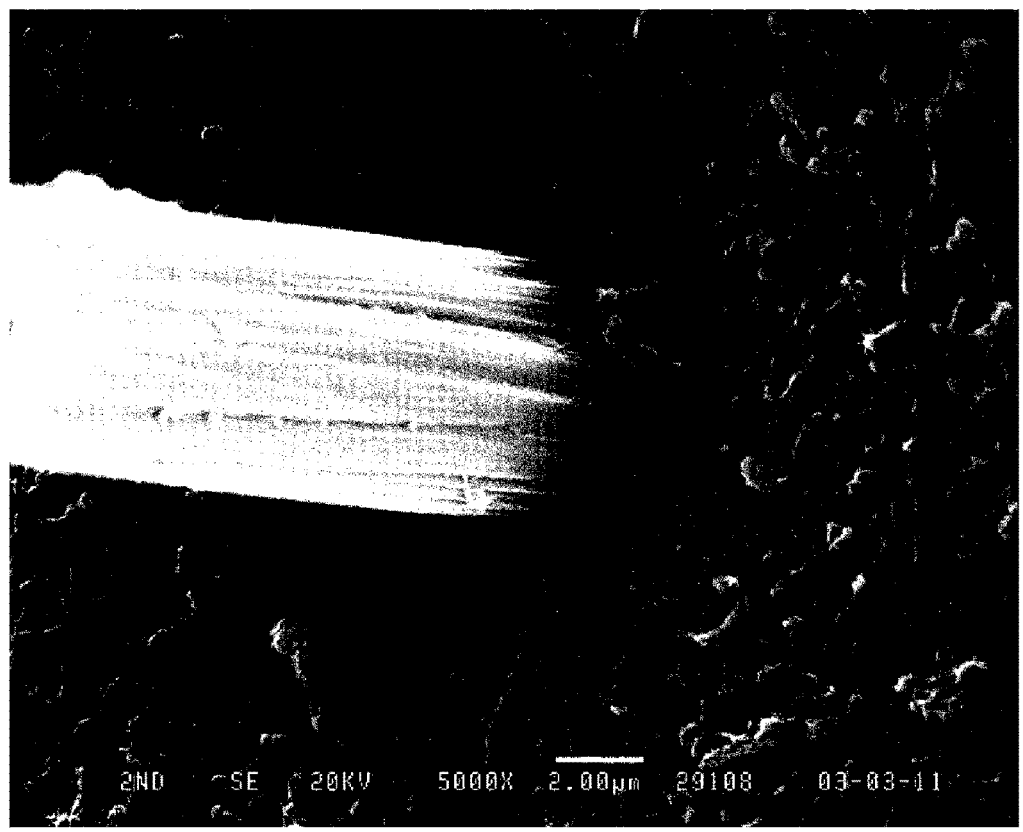
FIG. 2 is an electron microscopic picture of a composite manufactured in Comparative Example 1.

Further, electron microscopic pictures of the composite samples manufactured in Example 1 and Comparative Example 1 were compared in FIG. 1 and FIG. 2.

According to FIG. 2, it can be found that in the electron microscopic picture of the composite of Example 1, the polypropylene and the natural fiber are very effectively bound, compared to the composite of Comparative Example 1.

INDUSTRAIL APPLICABILITY

As described above, the present disclosure, which comprises the polypropylene-based compatibilizer, whose main chain is atactic polypropylene structure, particle diameter is small and anhydrous maleic acid content is high, together with the thermoplastic elastic rubber in the composite material made from the polyolefin resin and the natural fiber, can further improve the interfacial adhesive strength between the polyolefin resin and the natural fiber and dispersion efficiency. Thus, the composite composition obtains an effect of significantly improving the tensile strength, the flexural modulus, the impact strength, the heat deflection temperature, the contraction ratio and the like of the composite material. Accordingly, the composite of the present disclosure is useful as environmental friendly interior and exterior materials of vehicles having excellent mechanical properties, dimensional stability and surface quality.

The disclosure has been described in detail with reference to preferred embodiments thereof. However, it will be appreciated by those skilled in the art that changes may be made in these embodiments without departing from the principles and spirit of the disclosure, the scope of which is defined in the appended claims and their equivalents.

What is claimed is:

1. A polyolefin-natural fiber composite composition comprising:
   polyolefin resin having a melt index of 8 to 150 g/10 min (230° C., 2.16 Kgf) in 20 to 95 wt %;
   natural fiber in 3 to 40 wt %;
   thermoplastic elastic rubber in 1 to 30 wt %; and
   a polypropylene-based compatibilizer in 1 to 10 wt %, whose main chain is atactic polypropylene and whose diameter is 0.5 to 200 μm, and which is grafted with anhydrous maleic acid of 2 to 10 wt %,
   wherein the thermoplastic elastic rubber is ethylene-octene rubber (EOR) and the polyolefin resin is polypropylene.

2. The polyolefin-natural fiber composite composition of claim 1, wherein the natural fiber is at least one selected from the group consisting of kenaf, flax, hemp, jute, abaca, bamboo, coir, pineapple, ramie, sisal and henequen.

3. The polyolefin-natural fiber composite composition of claim 1, which further comprises at least one general additive selected from the group consisting of:
   an antioxidant, a UV stabilizer, a flame retardant, a coloring agent, a plasticizer, a thermal stabilizer, a slip agent and an antistatic agent.

4. A method for extrusion molding comprising a process of melt-extrusion molding the composition of claim 1 at the condition of screw rotation speed of 200 to 1,000 rpm and retention time of 10 to 60 sec.

5. A molded article manufactured by melt-extrusion molding the composition of claim 1 at the condition of screw rotation speed of 200 to 1,000 rpm and retention time of 10 to 60 sec.

* * * * *